US012300921B2

(12) United States Patent
Mamiya

(10) Patent No.: US 12,300,921 B2
(45) Date of Patent: May 13, 2025

(54) MALE TERMINAL FITTING AND CONNECTOR

(71) Applicant: SUMITOMO WIRING SYSTEMS, LTD., Mie (JP)

(72) Inventor: Yuma Mamiya, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 471 days.

(21) Appl. No.: 17/884,060

(22) Filed: Aug. 9, 2022

(65) Prior Publication Data

US 2023/0056049 A1 Feb. 23, 2023

(30) Foreign Application Priority Data

Aug. 17, 2021 (JP) ................................ 2021-132768

(51) Int. Cl.

| | |
|---|---|
| ***H01R 13/02*** | (2006.01) |
| ***H01R 13/05*** | (2006.01) |
| ***H01R 13/08*** | (2006.01) |
| ***H01R 13/639*** | (2006.01) |
| ***H01R 24/86*** | (2011.01) |

(52) U.S. Cl.

CPC ........... *H01R 13/055* (2013.01); *H01R 13/08* (2013.01); *H01R 13/639* (2013.01); *H01R 24/86* (2013.01)

(58) Field of Classification Search

CPC .... H01R 13/055; H01R 13/057; H01R 13/02; H01R 13/08; H01R 13/113; H01R 13/114; H01R 13/639; H01R 24/86

USPC .......................................................... 439/884

See application file for complete search history.

(56) References Cited

U.S. PATENT DOCUMENTS 6,375,521 B2 * 4/2002 Tachi ..................... H01R 43/16 439/877
6,402,575 B1 * 6/2002 Suzuki ................... H01R 13/04 439/866
6,659,814 B2 * 12/2003 Kojima .................. H01R 43/16 439/879
6,666,733 B2 * 12/2003 Takatsuki ............... H01R 43/16 439/866
6,752,669 B2 * 6/2004 Murakami ............. H01R 13/04 439/884
6,790,105 B2 * 9/2004 Fukatsu ............... H01R 13/055 439/884
6,790,106 B2 * 9/2004 Ito ......................... H01R 43/16 439/877
6,811,436 B2 * 11/2004 Tabata ................... H01R 13/04 439/595

(Continued)

FOREIGN PATENT DOCUMENTS

JP H11-224701 A 8/1999

*Primary Examiner* — Harshad C Patel
(74) *Attorney, Agent, or Firm* — Venjuris, P.C.

(57) ABSTRACT

A male terminal fitting is provided with a base wall extending in a front-rear direction, and a plate-like tab portion extending forward from a front end part of the base wall. The tab portion includes a first wall portion extending forward from the front end part of the base wall, a second wall portion facing the first wall portion, a coupling wall portion coupling side edges on one side, out of both left and right sides, of the first and second wall portions, and a contact wall portion extending from a side edge on the other side, out of the both left and right sides, of the first wall portion toward the second wall portion and abutting on the second wall portion.

10 Claims, 12 Drawing Sheets

(56) References Cited

U.S. PATENT DOCUMENTS

| | | | | |
|---|---|---|---|---|
| 6,851,977 | B2 * | 2/2005 | Tsuji .................. | H01R 13/4223 439/595 |
| 7,238,064 | B2 * | 7/2007 | Nakamura ........... | H01R 13/422 439/884 |
| 7,357,680 | B2 * | 4/2008 | Nakamura ............. | H01R 43/16 439/866 |
| 8,317,553 | B2 * | 11/2012 | Nishide .................. | H01R 43/16 439/884 |
| 2003/0060091 | A1 * | 3/2003 | Fukatsu ............... | H01R 13/055 439/884 |
| 2003/0096542 | A1 * | 5/2003 | Kojima .................. | H01R 43/16 439/884 |
| 2003/0157832 | A1 * | 8/2003 | Tabata ................. | H01R 13/642 439/587 |
| 2007/0072495 | A1 * | 3/2007 | Nakamura ............. | H01R 13/05 439/866 |
| 2011/0207374 | A1 * | 8/2011 | Tsuji ...................... | H01R 4/185 439/884 |
| 2021/0098918 | A1 * | 4/2021 | Teramoto ............... | H01R 13/04 |
| 2023/0053771 | A1 * | 2/2023 | Mamiya ............... | H01R 13/052 |

* cited by examiner

MALE TERMINAL FITTING AND CONNECTOR

CROSS-REFERENCE TO RELATED APPLICATIONS

This application is based on and claims priority from Japanese Patent Application No. 2021-132768, filed on Aug. 17, 2021, with the Japan Patent Office, the disclosure of which is incorporated herein in its entirety by reference.

TECHNICAL FIELD

The present disclosure relates to a male terminal fitting and a connector.

BACKGROUND

A male terminal fitting formed by bending a metal plate material is known from Japanese Patent Laid-open Publication No. H11-224701. This male terminal fitting includes, on a front end, a tab to be connected to a mating terminal. End edges of the metal plate material constituting the male terminal fitting are in contact on the upper surface of the tab. A part where the end edges of the metal plate material are in contact extends from a front end part to a rear end part of the tab.

SUMMARY

If the male terminal fitting configured such that the end edges of the metal plate material are in contact in the front end part of the tab as described above is applied to a connector including a mat seal, a problem of reducing the waterproofness of a connector may occur for the following reason.

The mat seal includes an insertion hole through which the male terminal fitting is inserted. The mat seal is mounted into a connector housing including a cavity for accommodating the male terminal fitting. With the mat seal mounted in the connector housing, the male terminal fitting is inserted into the insertion hole of the mat seal.

An inner lip projecting inward is formed in the insertion hole of the mat seal. By the close contact of the inner lip with the outer peripheral surface of a wire, the wire and the connector housing are sealed in a liquid-tight manner.

In inserting the male terminal fitting into the insertion hole, the front end part of the tab may contact the inner lip. Then, if the part where the end edges of the metal plate material are in contact is present in the front end part of the tab, the inner lip may be damaged by sharp edge parts formed on the end edges of the metal plate material. In this way, a reduction in the waterproofness of the connector is concerned.

The present disclosure was completed on the basis of the above situation and aims to provide a technique on a male terminal fitting suppressing the damage of a mat seal by a tab portion.

The present disclosure is directed to a male terminal fitting with a base wall extending in a front-rear direction, and a plate-like tab portion extending forward from a front end part of the base wall, wherein the tab portion includes a first wall portion extending forward from the front end part of the base wall, a second wall portion facing the first wall portion, a coupling wall portion coupling side edges on one side, out of both left and right sides, of the first and second wall portions, and a contact wall portion extending from a side edge on the other side, out of the both left and right sides, of the first wall portion toward the second wall portion and abutting on the second wall portion, the front end part of the first wall portion is provided with a first tip part approaching the second wall portion toward a front side and a front end part of the second wall portion is provided with a second tip part approaching the first wall portion toward the front side, a first contact part of a front end part of the first tip part and a second contact part of a front end part of the second tip part are in contact, and front end parts of the first and second contact parts are located closer to the second wall portion than a center position of an interval between an outer surface of the first wall portion and an outer surface of the second wall portion.

According to the present disclosure, the damage of a mat seal is suppressed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
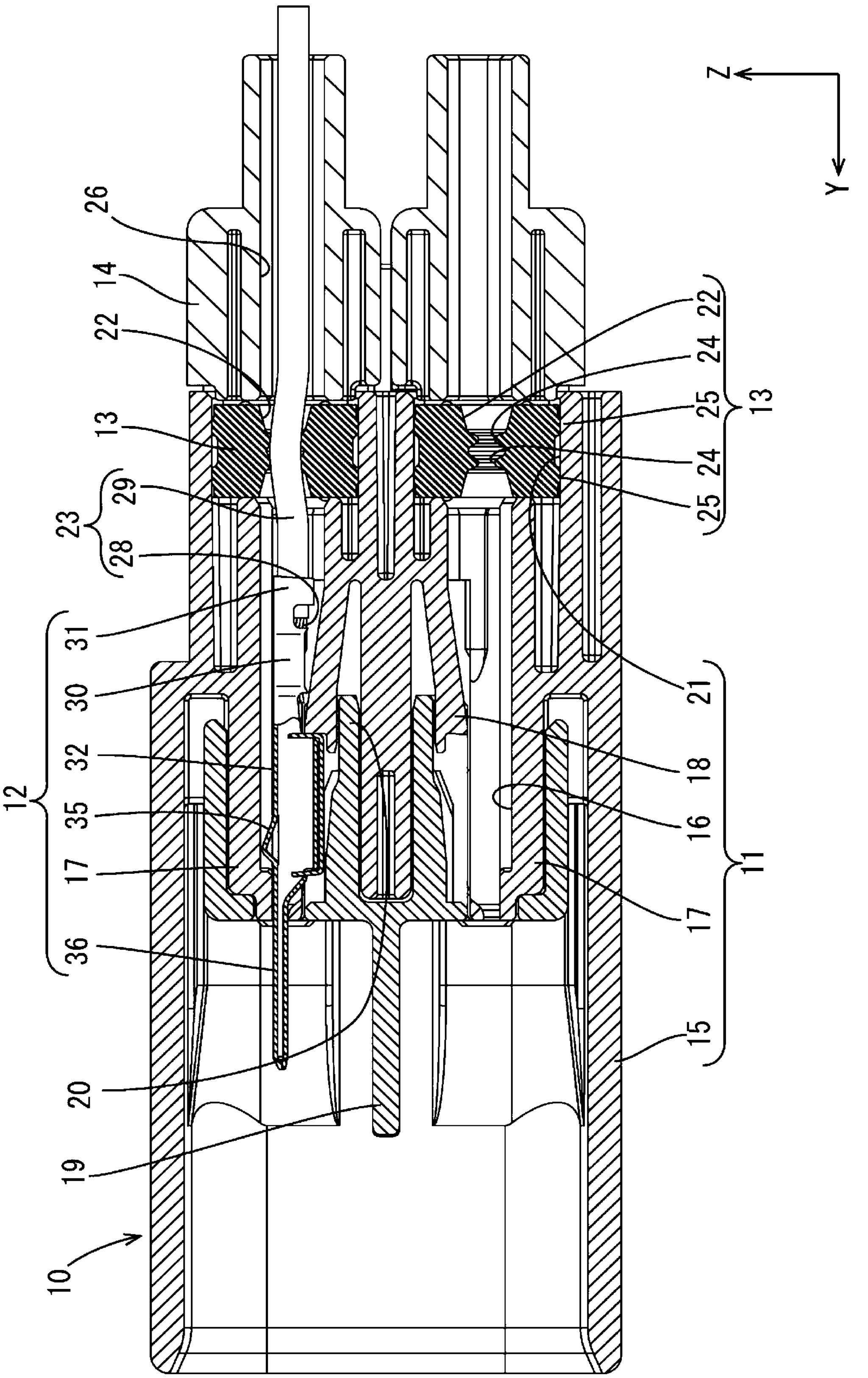
FIG. 1 is a section along I-I in FIG. 2 showing a connector according to one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The male terminal fitting of the present disclosure is provided with a base wall extending in a front-rear direction, and a plate-like tab portion extending forward from a front end part of the base wall, wherein the tab portion includes a first wall portion extending forward from the front end part of the base wall, a second wall portion facing the first wall portion, a coupling wall portion coupling side edges on one side, out of both left and right sides, of the first and second wall portions, and a contact wall portion extending from a side edge on the other side, out of the both left and right sides, of the first wall portion toward the second wall portion and abutting on the second wall portion, the front end part of the first wall portion is provided with a first tip part approaching the second wall portion toward a front side and a front end part of the second wall portion is provided with a second tip part approaching the first wall portion toward the front side, a first contact part of a front end part of the first tip part and a second contact part of a front end part of the second tip part are in contact, and front end parts of the first and second contact parts are located closer to the second wall portion than a center position of an interval between an outer surface of the first wall portion and an outer surface of the second wall portion.

If the male terminal fitting is inserted into the insertion hole of the mat seal including an inner lip inside, the outer surface of the first tip part of the male terminal fitting contacts the inner lip of the mat seal. In this way, the damage of the inner lip of the mat seal can be suppressed.

(2) Preferably, a first angle between the outer surface of the first tip part and the outer surface of the first wall portion is larger than a second angle between an outer surface of the second tip part and the outer surface of the second wall portion.

When the tab portion is viewed from front, a projection area of the first tip part from front is larger than that of the second tip part from front. Thus, there is a higher possibility that the outer surface of the first tip part contacts the inner lip of the mat seal. In this way, the damage of the inner lip of the mat seal can be further suppressed.

(3) Preferably, the first angle between the outer surface of the first tip part and the outer surface of the first wall portion is 203.6° or more and 212.7° or less, and the second angle between the outer surface of the second tip part and the outer surface of the second wall portion is 190.6° or more and 197.9° or less.

Since the first angle between the outer surface of the first tip part and the outer surface of the first wall portion is 203.6° or more, there is a higher possibility that the outer surface of the first tip part contacts the mat seal. Thus, the damage of the inner lip of the mat seal can be further suppressed.

Since the second angle between the outer surface of the second tip part and the outer surface of the second wall portion is 190.6° or more, the outer surface of the second tip part is inclined to approach the first wall portion toward the front side. Thus, the tab portion easily enters the insertion hole of the mat seal. Further, the outer surface of the second tip part is obliquely formed, an insertion resistance force when the tab portion contacts a resilient contact piece of a mating terminal can be reduced.

(4) Preferably, a percentage of an interval between a virtual plane as a forward extension of the outer surface of the first wall portion and the front end part of the first tip part to an interval between the outer surface of the first wall portion and the outer surface of the second wall portion is 35% or more and 52% or less.

When the tab portion is viewed from front, the projection area of the first tip part from front is larger than that of the second tip part from front. Thus, there is a higher possibility that the outer surface of the first tip part contacts the inner lip of the mat seal. In this way, the damage of the inner lip of the mat seal can be further suppressed.

(5) Preferably, a forward projecting length of the first tip part from the front end part of the first wall portion is larger than a forward projecting length of the second tip part from the front end part of the second wall portion.

When the tab portion is viewed from front, the projection area of the first tip part from front is larger than that of the second tip part from front. Thus, there is a higher possibility that the outer surface of the first tip part contacts the inner lip of the mat seal. In this way, the damage of the inner lip of the mat seal can be further suppressed.

(6) Preferably, a percentage of the projecting length of the first tip part from the front end part of the first wall portion to the projecting length of the second tip part from the front end part of the second wall portion is 101.8% or more and 138.2% or less.

Since the percentage of the projecting length of the first tip part from the front end part of the first wall portion to the projecting length of the second tip part from the front end part of the second wall portion is 101.8% or more, there is a higher possibility that the upper surface of the first tip part and the mat seal contact each other. Thus, the damage of the inner lip of the mat seal can be further suppressed.

Since the percentage of the projecting length of the first tip part from the front end part of the first wall portion to the projecting length of the second tip part from the front end part of the second wall portion is 138.2% or less, the outer surface of the second tip part is inclined to approach the first wall portion toward the front side. Thus, the tab portion easily enters the insertion hole of the mat seal. Further, since the outer surface of the second tip part is obliquely formed, an insertion resistance force when the tab portion contacts the resilient contact piece of the mating terminal can be reduced.

(7) Preferably, the front end part of the first tip part projects further forward than the front end part of the second tip part.

Since the front end part of the first tip part is located on the foremost side in the tab portion, the outer surface of the first tip part easily contacts the inner lip of the mat seal. In this way, the damage of the inner lip of the mat seal can be further suppressed.

(8) Preferably, a region where the first and second contact parts are in contact is inclined to approach the second wall portion toward the front side.

When the tab portion is viewed from front, the projection area of the first tip part from front is larger than that of the second tip part from front. Thus, there is a higher possibility that the upper surface of the first tip part contacts the inner lip of the mat seal. In this way, the damage of the inner lip of the mat seal can be further suppressed.

(9) Preferably, a contact region of the second wall portion with the contact wall portion serves as a recess recessed in a stepped manner with respect to the other region of the second wall portion.

Since a vertical length of the contact wall portion can be increased, it can be suppressed that the contact wall portion is separated from the second wall portion due to springback.

(10) A connector of the present disclosure is provided with the male terminal fitting of any one of (1) to (9) described above, a connector housing including a cavity for accommodating the male terminal fitting, a mat seal provided with an insertion hole corresponding to the cavity, the mat seal being mounted into the connector housing, and a holder for holding the mat seal mounted in the connector housing from behind in a mounting direction of the mat seal into the connector housing, wherein the holder includes a receiving hole extending in a front-rear direction at a position corresponding to the insertion hole, the male terminal fitting being inserted into the receiving hole, and the tab portion of the male terminal fitting is guided into the insertion hole of the mat seal by the outer surface of the first wall portion of the male terminal fitting sliding in contact with an inner peripheral surface of the receiving hole.

Details of Embodiment of Present Disclosure

Hereinafter, an embodiment of the present disclosure is described. The present disclosure is not limited to these illustrations and is intended to be represented by claims and include all changes in the scope of claims and in the meaning and scope of equivalents.

Embodiment

One embodiment of the present disclosure is described with reference to FIGS. 1 to 12. As shown in FIG. 1, a connector 10 according to this embodiment includes a connector housing 11, male terminal fittings 12, mat seals 13 and holders 14. In the following description, a direction indicated by an arrow Z is referred to as an upward direction, a direction indicated by an arrow Y is referred to as a forward direction and a direction indicated by an arrow X is referred to as a leftward direction. The above directions are set for the convenience of description. Note that contents of the present disclosure are not limited by the above directions. Further, for a plurality of identical members, only some members may be denoted by a reference sign and the other members may not be denoted by the reference sign.

[Connector 10]

The connector housing 11 is formed of an insulating synthetic resin material. As shown in FIG. 1, a receptacle 15 into which a mating female connector (not shown) is fit is formed to be open forward in a front end part of the connector housing 11. A tower portion 17 formed with cavities 16 for accommodating the male terminal fittings 12 is formed to project forward inside the receptacle 15.

Figure 2:
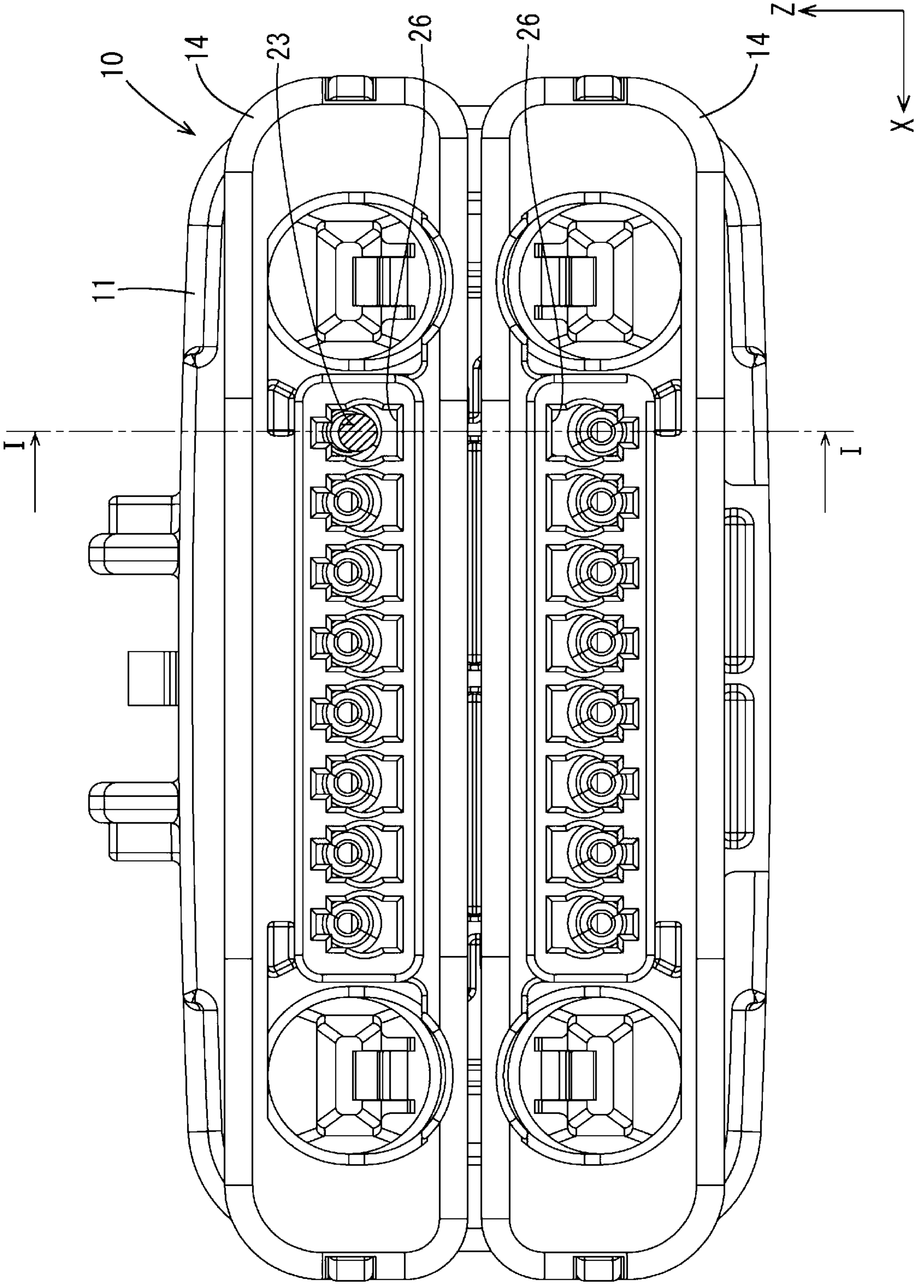
FIG. 2 is a back view showing the connector.

As shown in FIGS. 1 and 2, in this embodiment, a plurality of (eight in this embodiment) cavities 16 are formed side by side in a lateral direction in each of separate upper and lower stages. A locking lance 18 projecting inward from the inner wall of the cavity 16 is formed in the cavity 16. The locking lance 18 is formed to be resiliently deformable. The locking lance 18 retains and holds the male terminal fitting 12 in the cavity 16 by locking the male terminal fitting 12 to be described later from behind. In FIGS. 1 and 2, the male terminal fitting 12 accommodated in one cavity 16 is shown and the male terminal fittings 12 are not shown for the other cavities 16.

A front retainer 19 is fit to a front end part of the tower portion 17. The front retainer 19 is made of insulating synthetic resin. With the front retainer 19 fit to the tower portion 17, locking portions 20 of the front retainer 19 are disposed in deflection spaces into which the locking lances 18 are deflected and deformed. In this way, the resilient deformation of the locking lances 18 is suppressed. As a result, the male terminal fittings 12 are doubly locked in the connector housing 11 by the locking lances 18 and the front retainer 19.

Accommodation recesses 21 for accommodating the mat seals 13 are formed to be open rearward in a rear end part of the connector housing 11.

The mat seal 13 is made of rubber and shaped to be somewhat larger than the inner shape of the accommodation recess 21. The mat seal 13 is formed with a plurality of insertion holes 22 penetrating in the front-rear direction. With the mat seal 13 accommodated in the accommodation recess 21, the insertion holes 22 of the mat seal 13 correspond to the cavities 16 of the connector housing 11. Two inner lips 24 to be held in close contact with the outer periphery of a wire 23 to be described later in a liquid-tight manner are formed on the inner periphery of the insertion hole 22 while being spaced apart in the front-rear direction.

Two outer lips 25 to be held in close contact with the inner wall surface of the accommodation recess 21 in a liquid-tight manner are formed on the outer periphery of the mat seal 13 while being spaced apart in the front-rear direction.

The holder 14 is assembled with the rear end part of the connector housing 11 at a position behind an accommodation region of the mat seal 13. The holder 14 is made of insulating synthetic resin. With the holder 14 attached to the connector housing 11, the holder 14 is in contact with the mat seal 13 from behind. In this way, the mat seal 13 is retained and held in the connector housing 11. The holder 14 is formed with receiving holes 26 penetrating in the front-rear direction at positions corresponding to the insertion holes 22 of the mat seal 13.

[Male Terminal Fittings 12]

The male terminal fitting 12 is formed by press-working a metal plate material into a predetermined shape. As shown in FIG. 1, the male terminal fitting 12 is connected to a front end part of the wire 23 (see FIG. 1). The wire 23 is connected to a rear end part of the male terminal fitting 12. The wire 23 includes a core wire 28 made of metal and an insulation coating 29 made of insulating synthetic resin for surrounding the outer periphery of the core wire 28.

Figure 3:
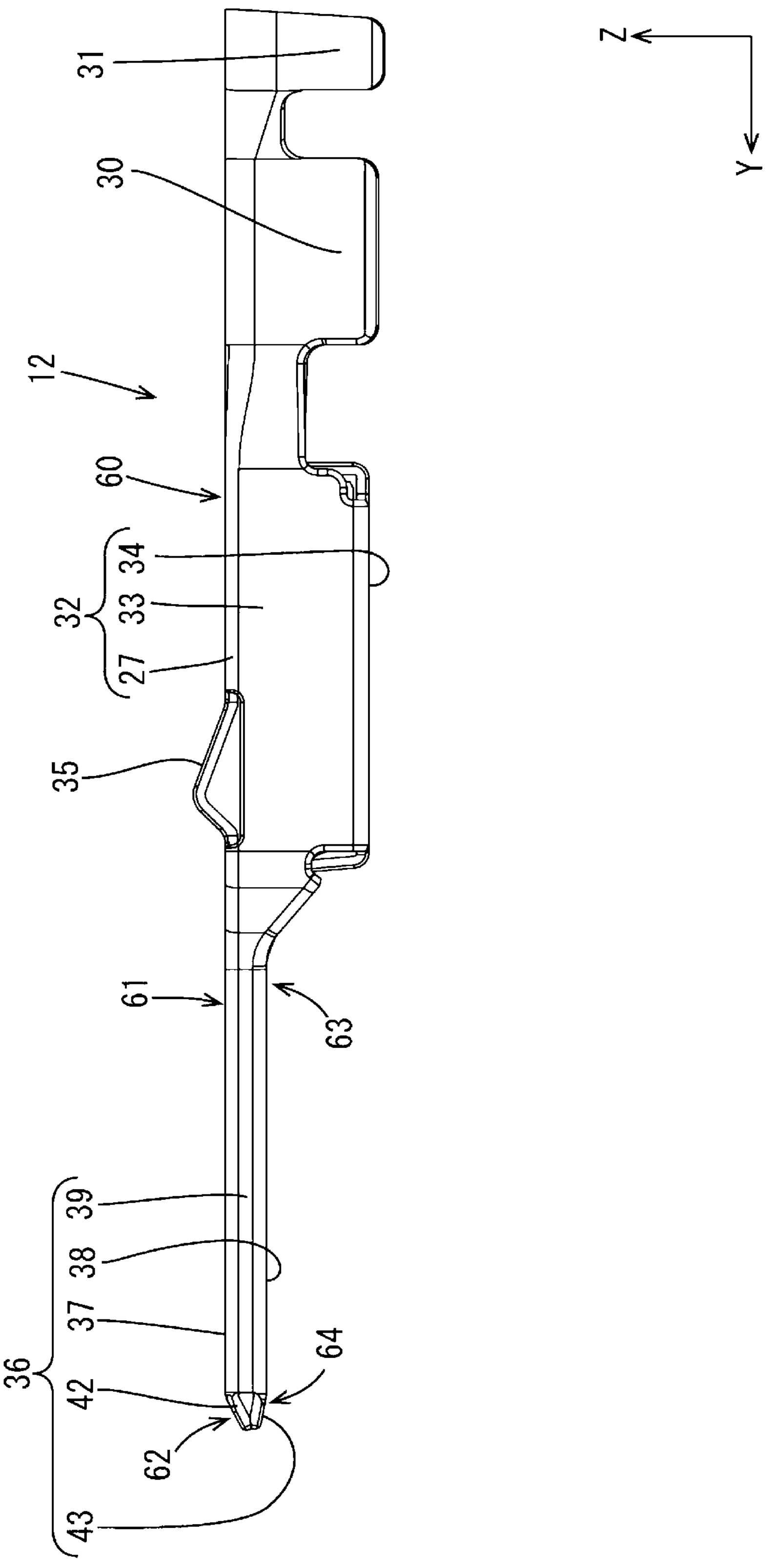
FIG. 3 is a side view showing a male terminal fitting.

As shown in FIG. 3, the male terminal fitting 12 includes a base wall 27 extending in the front-rear direction. A wire barrel portion 30 to be crimped to the core wire 28 of the wire 23 and an insulation barrel portion 31 to be crimped to the insulation coating 29 surrounding the core wire 28 of the wire 23 are provided side by side in the front-rear direction in a rear end part of the base wall 27. The wire barrel portion 30 is provided in front of the insulation barrel portion 31.

A tubular body portion 32 in the form of a rectangular tube is formed in a front half of the base wall 27 and in front of the wire barrel portion 30. The tubular body portion 32 is formed with side walls 33 extending downward perpendicularly to a wall surface of the base wall 27 on both left and right side edges of the base wall 27. A covering wall 34 extending toward the other side wall 33 is formed from a tip part of one side wall 33. The base wall 27 is formed to extend from a rear end part of the insulation barrel portion 31 to a front end part of the tubular body portion 32.

A stabilizer 35 projecting upward is formed at a position near a front end part of the base wall 27. The stabilizer 35 is formed into a chevron shape projecting upward when viewed laterally. The insertion of the male terminal fitting 12 in a vertically inverted posture can be suppressed by the stabilizer 35 when the male terminal fitting 12 is inserted into the receiving hole 26 of the holder 14.

As shown in FIG. 1, with the male terminal fitting 12 accommodated in the cavity 16, a front end part of the locking lance 18 is locked to a rear end part of the tubular body portion 32 from behind, whereby the male terminal fitting 12 is retained and held in the cavity 16.

Figure 4:
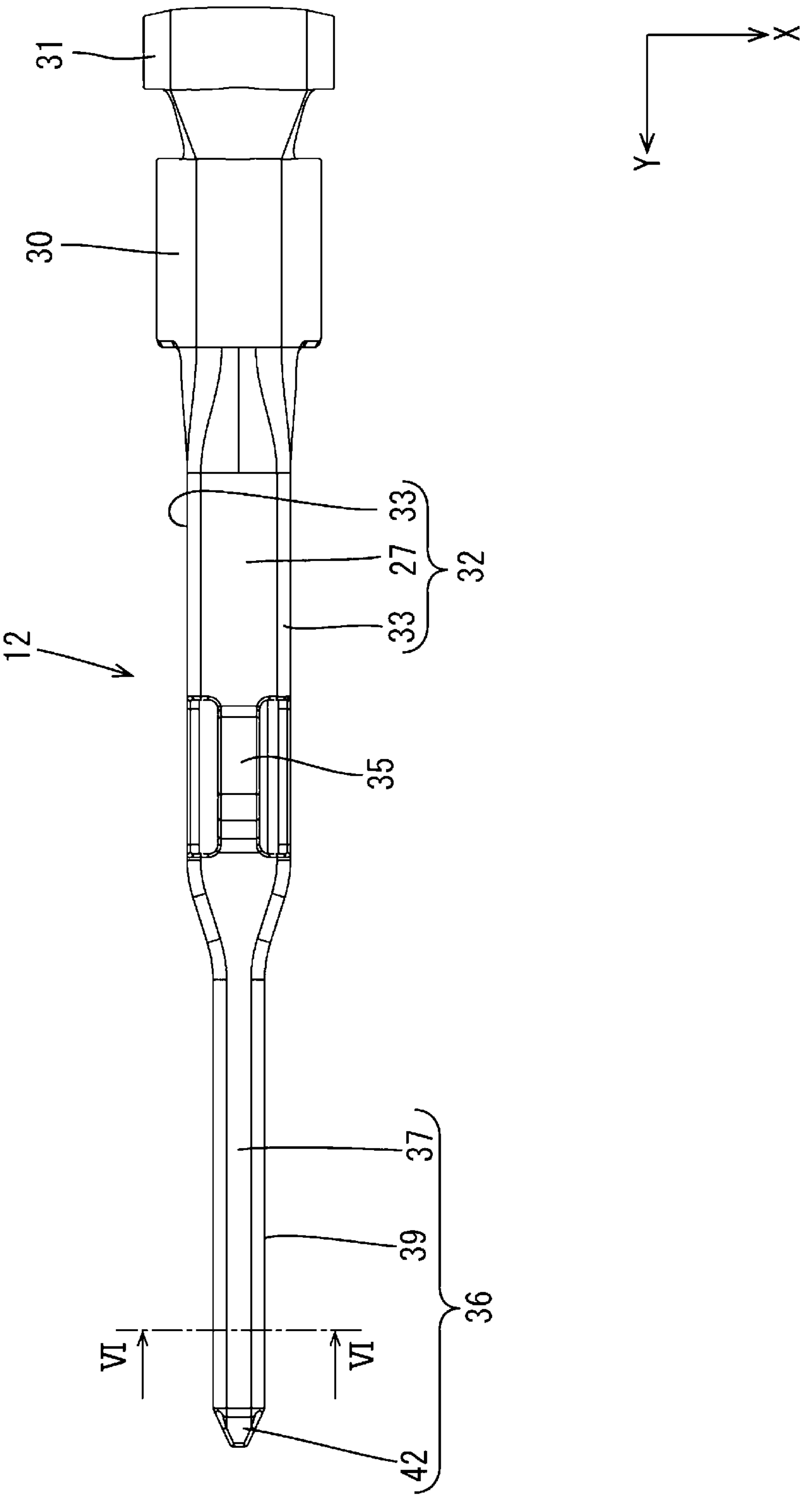
FIG. 4 is a plan view showing the male terminal fitting.
Figure 5:
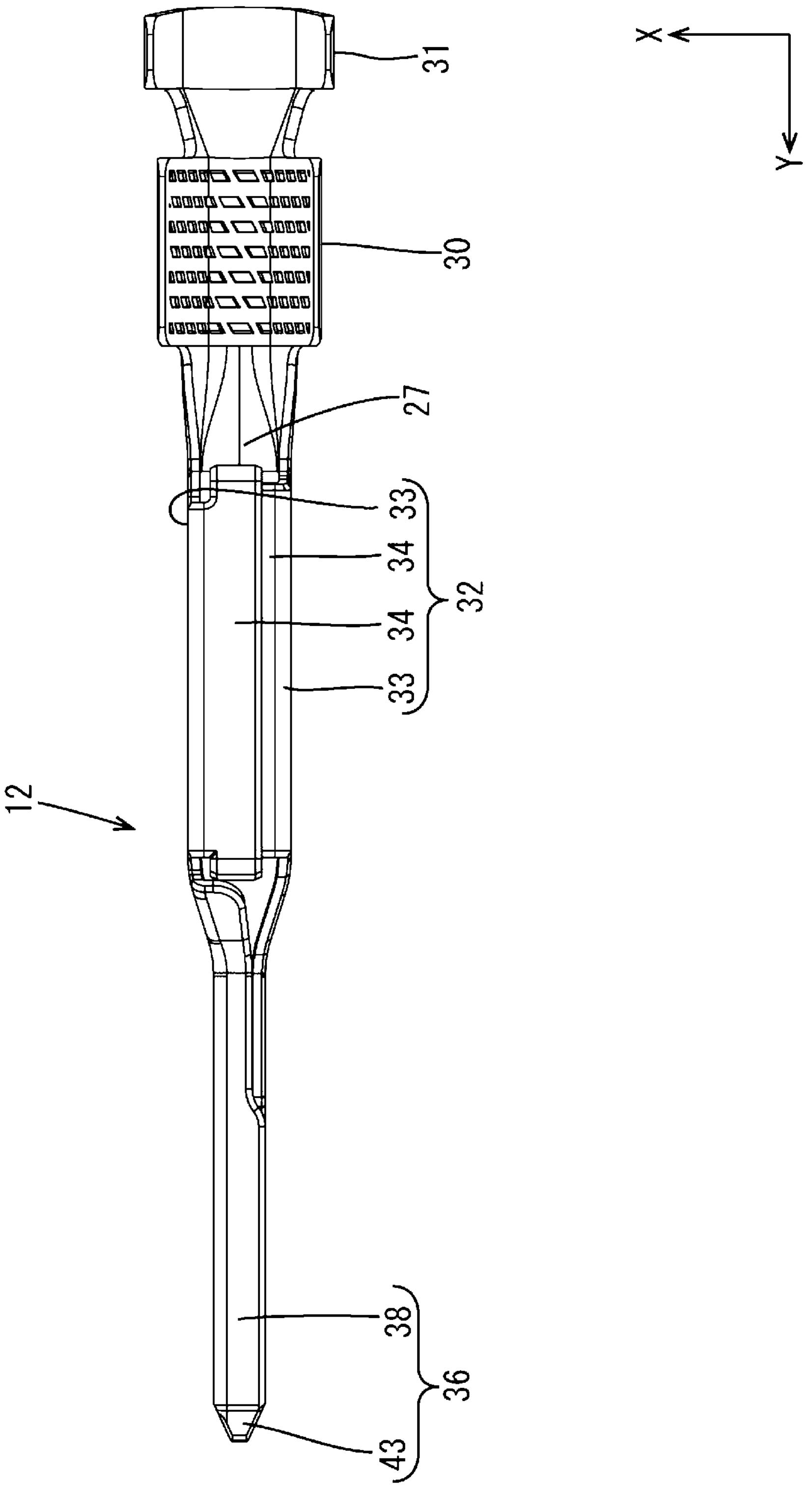
FIG. 5 is a bottom view showing the male terminal fitting.

As shown in FIG. 3, a plate-like tab portion 36 is formed to be elongated forward from the front end part of the base wall 27 in front of the tubular body portion 32. A height of the tab portion 36 is set smaller than that of the tubular body portion 32 in the vertical direction. Further, as shown in FIGS. 4 and 5, a width of the tab portion 36 is set smaller than that of the tubular body portion 32 in the lateral direction. An upper surface 60 (an example of an outer surface) of the base wall 27 and an upper surface 61 (an example of an outer surface) of a first wall portion 37 are formed to be flush with each other.

Figure 6:
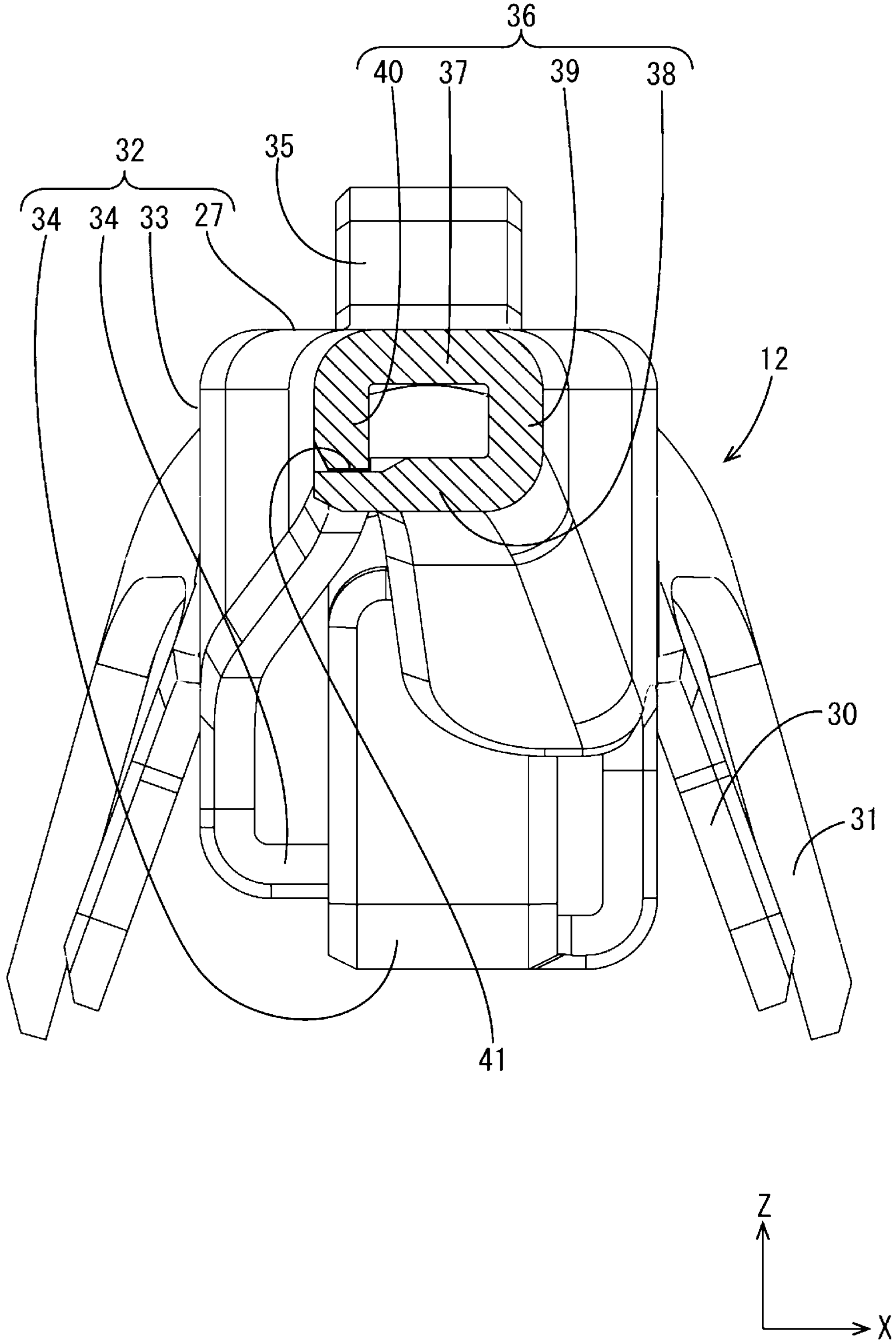
FIG. 6 is a section along VI-VI in FIG. 4.

As shown in FIG. 6, the tab portion 36 includes the first wall portion 37 extending forward from the front end part of the base wall 27, a second wall portion 38 facing the first wall portion 37, a coupling wall portion 39 coupling the left side edge of the first wall portion 37 and the left side edge of the second wall portion 38, and a contact wall portion 40 extending from the right side of the first wall portion 37 toward the second wall portion 38 and abutting on the second wall portion 38.

As shown in FIG. 6, out of the second wall portion 38, a region in contact with a lower end part of the contact wall portion 40 is formed with a recess 41 recessed in a stepped manner with respect to the other region of the second wall portion 38. A tip part of the contact wall portion 40 is in contact with the inner wall surface of the recess 41.

Figure 7:
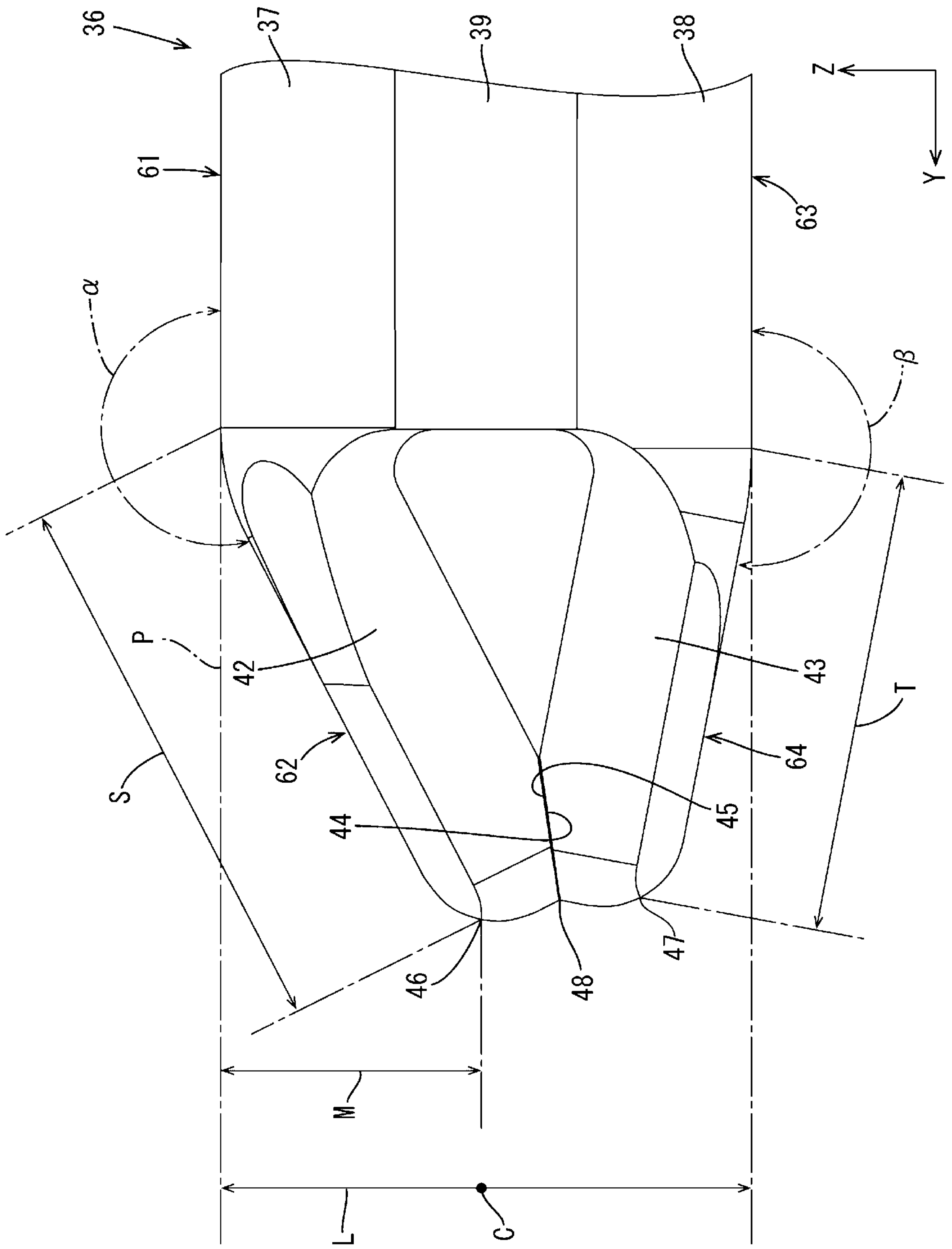
FIG. 7 is a partial enlarged side view showing a front end part of a tab portion.

As shown in FIG. 7, a front end part of the first wall portion 37 is provided with a first tip part 42 bent in a direction approaching the second wall portion 38 toward a front side. The first tip part 42 is formed into a triangular shape tapered in the lateral direction when viewed from above.

A front end part of the second wall portion 38 is provided with a second tip part 43 bent in a direction approaching the first wall portion 37 toward the front side. The second tip part 43 is formed into a triangular shape tapered in the lateral direction when viewed from below.

A front end part of the first tip part 42 serves as a first front end part 46, and a front end part of the second tip part 43 serves as a second front end part 47. A part near the first front end part 46 and a part near the second front end part 47 are in contact. A part of the first tip part 42 in contact with the second tip part 43 serves as a first contact part 44, and a part of the second tip part 43 in contact with the first tip part 42 serves as a second contact part 45. A region where the first and second contact parts 44, 45 are in contact is inclined to approach the second wall portion 38 from the first wall portion 37 toward the front side.

Front end parts of the first and second contact parts 44, 45 serve as third front end parts 48. The third front end parts 48 are offset toward the second wall portion 38 from a center position C of an interval L between the upper surface 61 of the first wall portion 37 and a lower surface 63 (an example of an outer surface) of the second wall portion 38.

A first angle α between the upper surface 62 (an example of the outer surface) of the first tip part 42 and the upper surface 61 (an example of the outer surface) of the first wall portion 37 is set larger than a second angle β between a lower surface 64 (an example of the outer surface) of the second tip part 43 and the lower surface 63 (an example of the outer surface) of the second wall portion 38. The first angle α between the upper surface 62 of the first tip part 42 and the upper surface 61 of the first wall portion 37 is preferably set to 203.6° or more and 212.7° or less. The second angle β between the lower surface 64 of the second tip part 43 and the lower surface 63 of the second wall portion 38 is preferably set to 190.6° or more and 197.9° or less.

A percentage of an interval M between a virtual plane P as a forward extension of the upper surface 61 of the first wall portion 37 and the first front end part 46 to the interval L between the upper surface 61 of the first wall portion 37 and the lower surface 63 of the second wall portion 38 is preferably 35% or more and 52% or less.

The first front end part 46 projects further forward than the second front end part 47.

Manufacturing Process of Embodiment

Next, an example of a manufacturing process of the connector 10 according to this embodiment is described. The manufacturing process of the connector 10 is not limited to the one described below.

Figure 8:
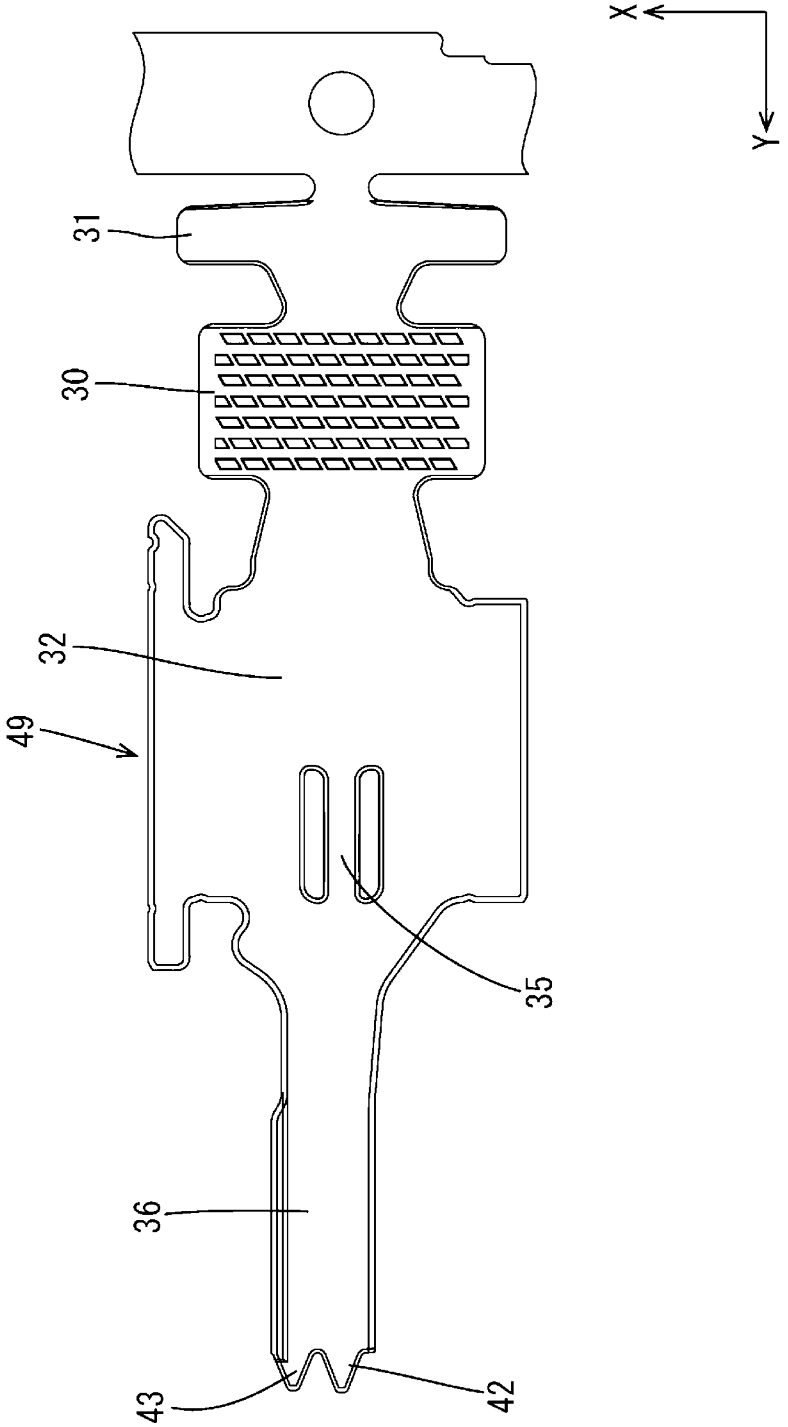
FIG. 8 is a plan view (development) showing a metal plate material before being bent.

A metal plate material 49 is press-worked into a developed shape shown in FIG. 8. Subsequently, the metal plate material 49 worked into the developed shape is bent, whereby the male terminal fitting 12 is formed into a predetermined shape. Further, by applying press-working, the first and second tip parts 42, 43 are formed into predetermined shapes.

The mat seals 13 are inserted into the accommodation recesses 21 of the connector housing 11 from behind. Subsequently, the holders 14 are attached to the rear end part of the connector housing 11 from behind. In this way, the mat seals 13 are restricted and held in the connector housing 11. Further, the mat seals 13 and the connector housing 11 are sealed in a liquid-tight manner by the close contact of the outer lips 25 of the mat seals 13 and the inner walls of the accommodation recesses 21.

The male terminal fitting 12 is mounted on the front end part of the stripped wire 23. In particular, the wire barrel portion 30 is crimped to the core wire 28 of the wire 23 and the insulation barrel portion 31 is crimped to the insulation coating 29 of the wire 23.

The male terminal fitting 12 is so disposed that the tab portion 36 is located on a front side and the stabilizer 35 is located on an upper side in a rear part of the connector housing 11. The male terminal fitting 12 is inserted into the receiving hole 26 of the holder 14 from behind with the tab portion 36 facing forward.

Figure 9:
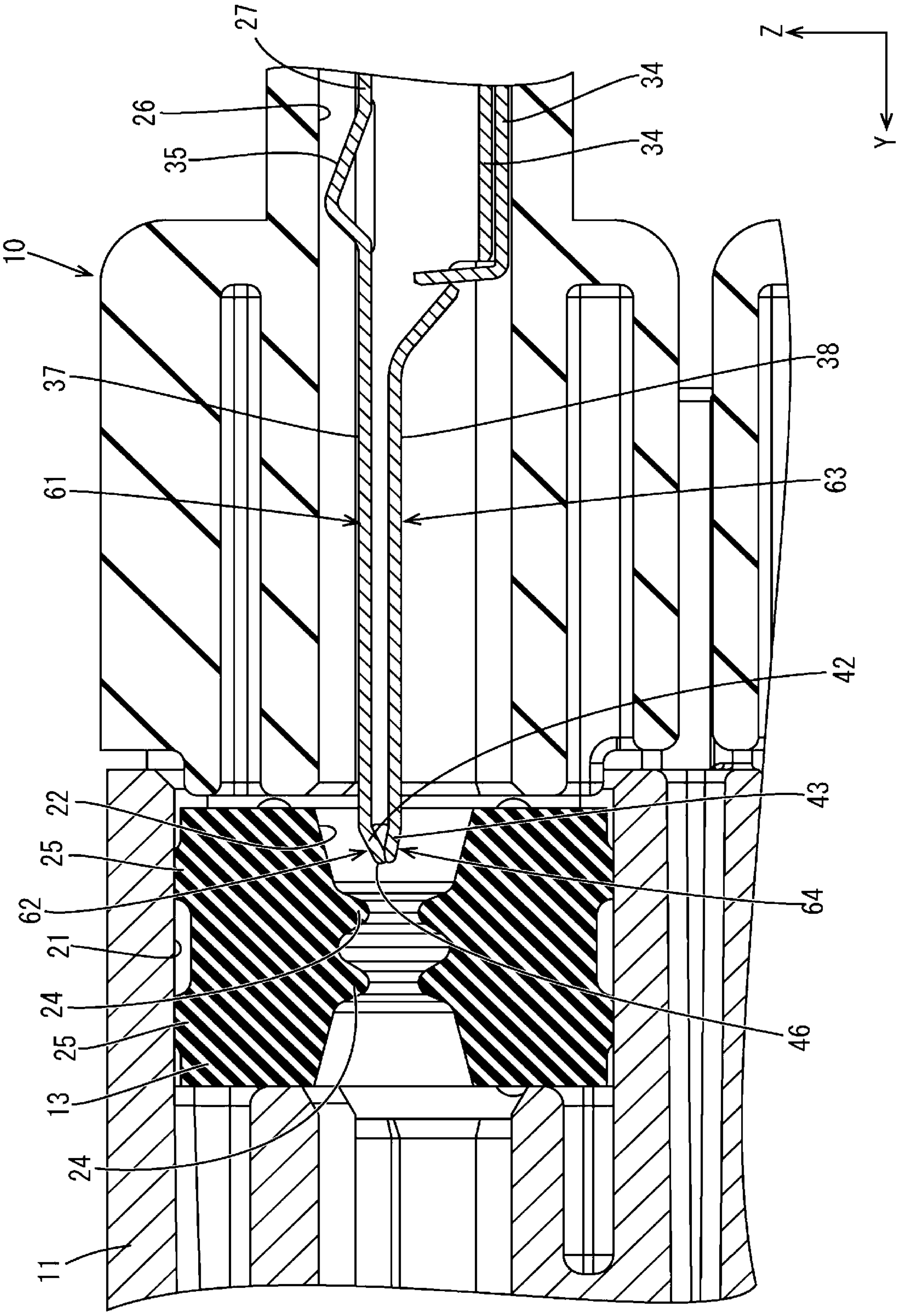
FIG. 9 is a partial enlarged section showing a state where the tab portion is inserted in an insertion hole of a mat seal.

As shown in FIG. 9, the male terminal fitting 12 is held in a predetermined posture in the receiving hole 26 by the sliding contact of the inner wall of the receiving hole 26 and the outer surfaces of the stabilizer 35 and the tubular body portion 33 of the male terminal fitting 12. The male terminal fitting 12 is movable in the vertical direction and lateral direction within ranges allowed by tolerances in the receiving hole 26.

If the male terminal fitting 12 is pushed further forward, the front end part of the tab portion 36 enters the insertion hole 22 of the mat seal 13.

As shown in FIGS. 4 and 5, the first and second tip parts 42, 43 of the tab portion 36 are formed into a triangular shape tapered in the lateral direction when viewed from the vertical direction in this embodiment. This prevents both left and right side edges of the first and second tip parts 42, 43 of the tab portion 36 from contacting both left and right side edges of the inner lips 24 of the mat seal 13.

Further, since the second tip part 43 of the tab portion 36 is bent obliquely to a front upper side from the second wall portion 38 in this embodiment as shown in FIG. 7, the second tip part 43 of the tab portion 36 is prevented from contacting the lower edges of the inner lips 24 of the mat seal 13.

Further, as shown in FIG. 7, the third front end parts 48 are located closer to the second wall portion 38 than the center position C of the interval L between the upper surface 61 of the first wall portion 37 and the lower surface 63 of the second wall portion 38 in this embodiment. This causes the third front end parts 48 to be offset toward the second wall portion 38 from the center position C of the interval L between the upper surface 61 of the first wall portion 37 and the lower surface 63 of the second wall portion 38 in the vertical direction. As a result, with the male terminal fitting 12 inserted in the receiving hole 26, the first and second tip parts 42, 43 of the tab portion 36 do not contact the upper edges of the inner lips 24 of the mat seal 13 or the upper surface 62 of the first tip part 42 of the tab portion 36 contacts the upper edges of the inner lips 24 of the mat seal 13.

If the first and second tip parts 42, 43 of the tab portion 36 do not contact the upper edges of the inner lips 24 of the mat seal 13, the first and second tip parts 42, 43 of the tab portion 36 do not contact the entire peripheral edges of the inner lips 24 of the mat seal 13. Thus, it can be suppressed that the inner lips 24 are damaged due to the contact of the first and second tip parts 42, 43 of the tab portion 36 with the inner lips 24.

Figure 10:
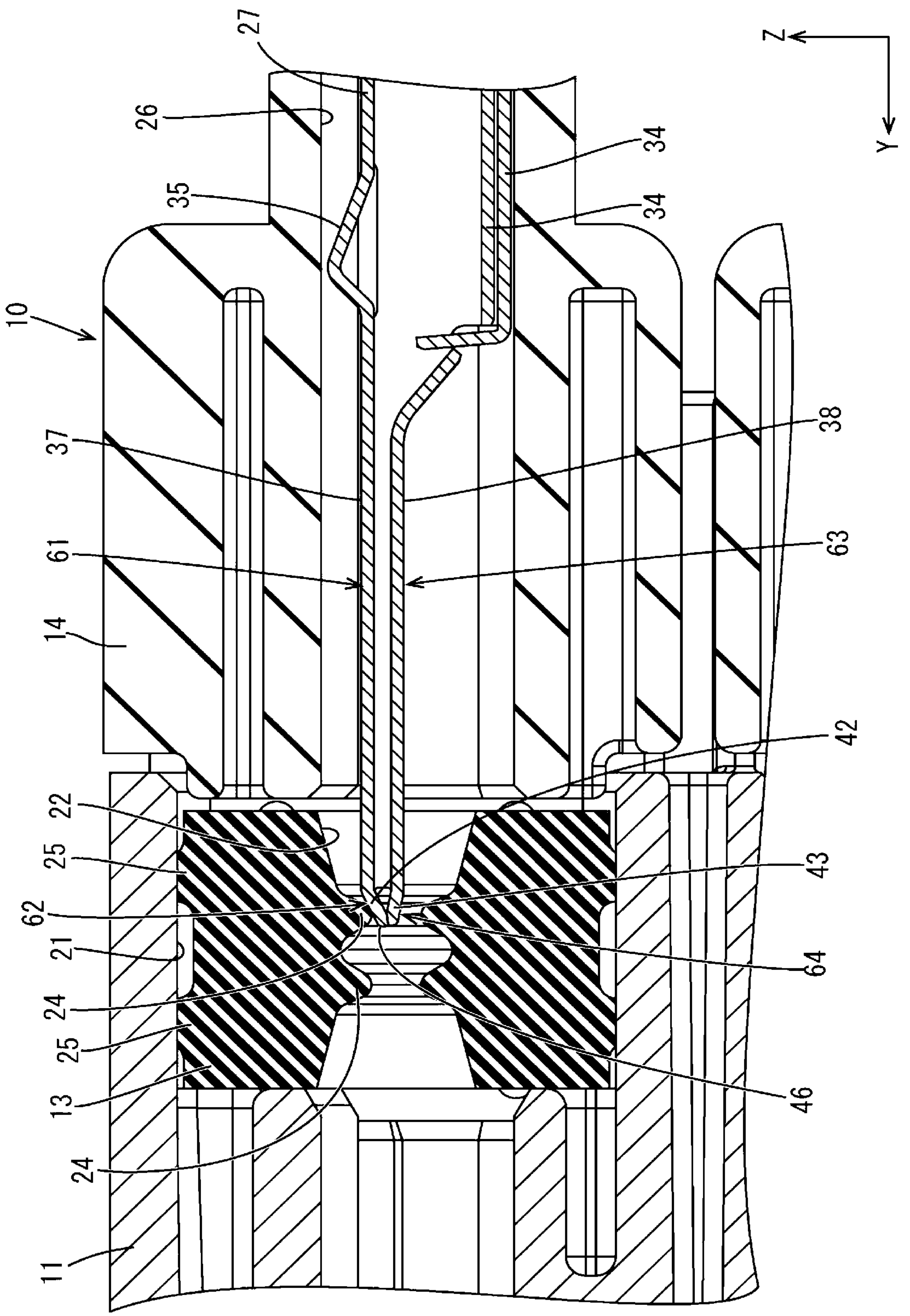
FIG. 10 is a partial enlarged section showing a state where the tab portion is in contact with an inner lip of the mat seal.

If the upper surface 62 of the first tip part 42 of the tab portion 36 contacts the upper edges of the inner lips 24 of the mat seal 13 as shown in FIG. 10, it is suppressed that the inner lips 24 of the mat seal 13 are damaged due to contact with the end edges of the metal plate material 49 constituting the male terminal fitting 12 since a part where the end edges of the metal plate material 49 constituting the male terminal fitting 12 are in contact is not present on the upper surface 62 of the first tip part 42. Further, since the first front end part 46 does not contact the upper edges of the inner lips 24 of the mat seal 13, it can be suppressed that the inner lips 24 of the mat seal 13 are damaged due to the contact of the first front end part 46 with the upper edges of the inner lips 24.

By pushing the male terminal fitting 12 further forward, the male terminal fitting 12 enters the cavity 16 of the connector housing 11. The locking lance 18 is resiliently locked to the rear end part of the tubular body portion 32 of the male terminal fitting 12 from behind, whereby the male terminal fitting 12 is restricted and held in the cavity 16.

The wire 23 and the mat seal 13 are sealed in a liquid-tight manner by the close contact of the inner lips 24 of the mat seal 13 with the outer periphery of the insulation coating 29 of the wire 23.

The front retainer 19 is mounted to the front end part of the tower portion 17 from front. The locking portions 20 of the front retainer 19 enter the deflection spaces for the locking lances 18. In this way, the male terminal fittings 12 are doubly locked by the front retainer 19. In the above way, the connector 10 is completed (see FIG. 1).

Functions and Effects of Embodiment

Next, functions and effects of this embodiment are described. The male terminal fitting 12 according to this embodiment includes the base wall 27 extending in the front-rear direction and the plate-like tab portion 36 extending forward from the front end part of the base wall 27. The tab portion 36 includes the first wall portion 37 extending forward from the front end part of the base wall 27, the second wall portion 38 facing the first wall portion 37, the coupling wall portion 39 coupling the side edges on one side, out of both left and right sides, of the first wall portion 37 and the second wall portion 38, and the contact wall portion 40 extending from the side edge on the other side, out of the both left and right side edges, of the first wall portion 37 toward the second wall portion 38 and abutting on the second wall portion 38. The front end part of the first wall portion 37 is provided with the first tip part 42 approaching the second wall portion 38 toward the front side, and the front end part of the second wall portion 38 is provided with the second tip part 43 approaching the first wall portion 37 toward the front side. The first contact part 44 of the front end part of the first tip part 42 and the second contact part 45 of the front end part of the second tip part 43 are in contact. The third front end parts 48 are located closer to the second wall portion 38 than the center position C of the interval L between the upper surface 61 of the first wall portion 37 and the lower surface 63 of the second wall portion 38.

Further, the connector 10 according to this embodiment is provided with the male terminal fittings 12 described above, the connector housing 11 including the cavities 16 for accommodating the male terminal fittings 12, the mat seals 13 provided with the insertion holes 22 corresponding to the cavities 16 and to be mounted into the connector housing 11, and the holders 14 for holding the mat seals 13 mounted in the connector housing 11 from behind. The holder 14 includes the receiving holes 26 extending in the front-rear direction at the positions corresponding to the insertion holes 22, and the male terminal fittings 12 are inserted into the receiving holes 26. The tab portion 36 of the male terminal fitting 12 is guided into the insertion hole 22 of the mat seal 13 by the outer surface of the first wall portion 37 of the male terminal fitting 12 sliding in contact with the inner peripheral surface of the receiving hole 26.

In this embodiment, the third front end parts 48 are located closer to the second wall portion 38 than the center position C of the interval L between the upper surface 61 of the first wall portion 37 and the lower surface 63 of the second wall portion 38. In this way, the front end parts of the first and second contact parts 44, 45 are offset toward the second wall portion 38 from the center position C of the interval L between the upper surface 61 of the first wall portion 37 and the lower surface 63 of the second wall portion 38 in the vertical direction.

Figure 11:
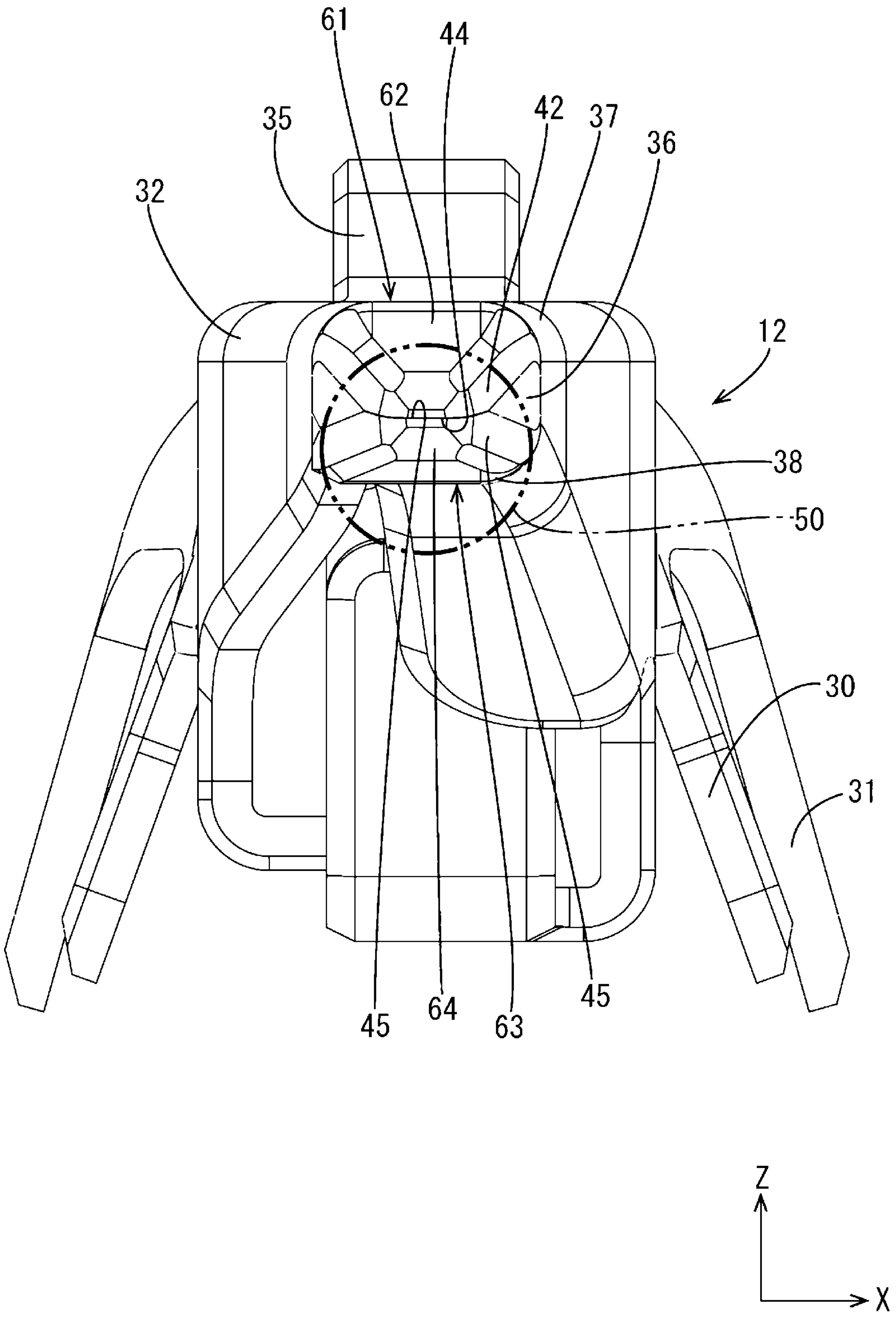
FIG. 11 is a front view of the male terminal fitting showing a positional relationship of the tab portion of the male terminal fitting and an opening edge part of the insertion hole defined by the inner lip.

FIG. 11 shows a relative arrangement of an opening edge part 50 of the inner lip 24 and the first and second tip parts 42, 43 when the male terminal fitting 12 is located on an uppermost side in the receiving hole 26 of the holder 14. The first and second front end parts 46, 47 are located in a space surrounded by the opening edge part 50 of the inner lip 24. In this way, the contact of the first and second front end parts 46, 47 with the inner lip 24 is suppressed, wherefore the damage of the inner lip 24 by the tab portion 36 can be suppressed.

According to this embodiment, the tab portion 36 includes the first wall portion 37 extending forward from the front end part of the base wall 27, the second wall portion 38 facing the first wall portion 37, the coupling wall portion 39 coupling the left side edges of the first wall portion 37 and the second wall portion 38, and the contact wall portion 40 extending from the right side edge of the first wall portion 37 toward the second wall portion 38 and abutting on the second wall portion 38. In this way, the part where the end edges of the metal plate material 49 constituting the male terminal fitting 12 are in contact is located in a part where the contact wall portion 40 and the second wall portion 38 are in contact. As a result, the part where the end edges of the metal plate material 49 constituting the male terminal fitting 12 are in contact is not located on the upper surface 62 of the first tip part 42 to be possibly brought into contact with the inner lips 24. As a result, the end edges of the metal plate material 49 constituting the male terminal fitting 12 and the inner lips 24 do not contact each other, wherefore the damage of the inner lips 24 can be suppressed.

According to this embodiment, the first angle c between the upper surface 62 of the first tip part 42 and the upper surface 61 of the first wall portion 37 is larger than the second angle β between the lower surface 64 of the second tip part 43 and the lower surface 63 of the second wall portion 38.

Figure 12:
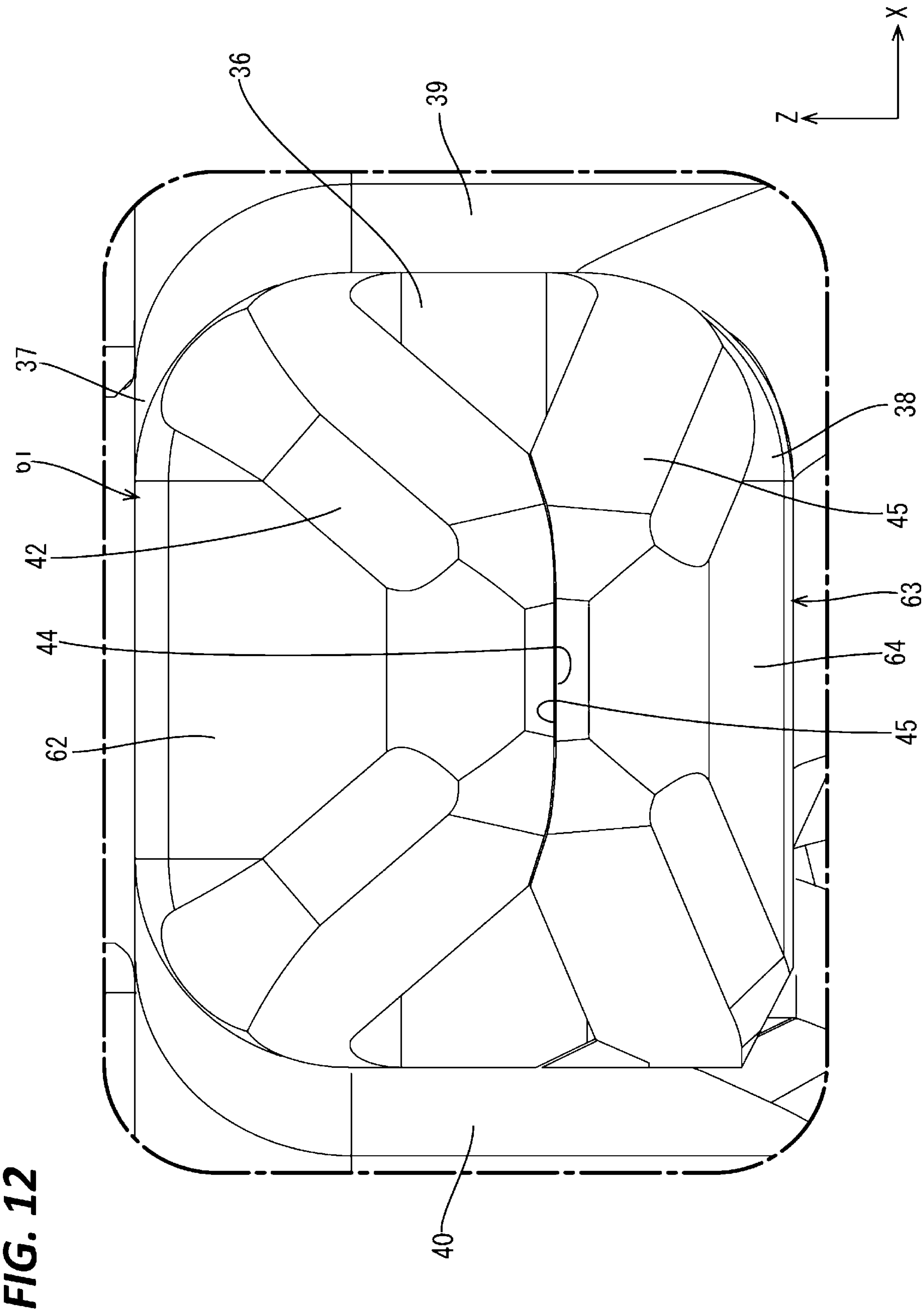
FIG. 12 is a partial enlarged front view showing a front end part of the tab portion.

As shown in FIG. 12, when the tab portion 36 is viewed from front, a projection area of the first tip part 42 from front is larger than that of the second tip part 43 from front. Thus, there is a higher possibility that the outer surface of the first tip part 42 contacts the inner lips 24 of the mat seal 13. In this way, the damage of the inner lips 24 of the mat seal 13 can be further suppressed.

According to this embodiment, since the first angle cc between the upper surface 62 of the first tip part 42 and the upper surface 61 of the first wall portion 37 is 203.6° or more and 212.7° or less, and the second angle β between the lower surface 64 of the second tip part 43 and the lower surface 63 of the second wall portion 38 is 190.6° or more and 197.9° or less.

Since the first angle c between the upper surface 62 of the first tip part 42 and the upper surface 61 of the first wall portion 37 is 203.6° or more, there is a higher possibility that the upper surface 62 of the first tip part 42 and the mat seal 13 contact each other. Thus, the damage of the inner lips 24 of the mat seal 13 can be further suppressed.

Since the second angle β between the lower surface 64 of the second tip part 43 and the lower surface 63 of the second wall portion 38 is 190.6° or more, the lower surface 64 of the second tip part 43 is inclined to approach the first wall portion 37 toward the front side. Thus, the tab portion 36 easily enters the insertion hole 22 of the mat seal 13. Further, since the lower surface 64 of the second tip part 43 is obliquely formed, an insertion resistance force when the tab portion 36 contacts a resilient contact piece (not shown) of a mating terminal (not shown) can be reduced.

The percentage of the interval M between the virtual plane P as a forward extension of the upper surface 61 of the first wall portion 37 and the first front end part 46 of the first tip part 42 to the interval L between the upper surface 61 of the first wall portion 37 and the lower surface 63 of the second wall portion 38 is 35% or more and 52% or less.

When the tab portion 36 is viewed from front, the projection area of the first tip part 42 from front is larger than that of the second tip part 43 from front. Thus, there is a higher possibility that the outer surface of the first tip part 42 contacts the inner lips 24 of the mat seal 13. In this way, the damage of the inner lips 24 of the mat seal 13 can be further suppressed.

A forward projecting length S of the first tip part 42 from the front end part of the first wall portion 37 is larger than a forward projecting length T of the second tip part 43 from the front end part of the second wall portion 38.

When the tab portion 36 is viewed from front, the projection area of the first tip part 42 from front is larger than that of the second tip part 43 from front. Thus, there is a higher possibility that the upper surface 62 of the first tip part 42 contacts the inner lips 24 of the mat seal 13. In this way, the damage of the inner lips 24 of the mat seal 13 can be further suppressed.

A percentage of the projecting length S of the first tip part 42 from the front end part of the first wall portion 37 to the projecting length T of the second tip part 43 from the front end part of the second wall portion 38 is 101.8% or more and 138.2% or less.

Since the percentage of the projecting length S of the first tip part 42 from the front end part of the first wall portion 37 to the projecting length T of the second tip part 43 from the front end part of the second wall portion 38 is 101.8% or more, there is a higher possibility that the upper surface 62 of the first tip part 42 and the mat seal 13 contact each other. Thus, the damage of the inner lips 24 of the mat seal 13 can be further suppressed.

Since the percentage of the projecting length S of the first tip part 42 from the front end part of the first wall portion 37 to the projecting length T of the second tip part 43 from the front end part of the second wall portion 38 is 138.2% or less, the lower surface 64 of the second tip part 43 is inclined to approach the first wall portion 47 toward the front side. Thus, the tab portion 36 easily enters the insertion hole 22 of the mat seal 13. Further, since the lower surface 64 of the second tip part 43 is obliquely formed, an insertion resistance force when the tab portion 36 contacts the resilient contact piece of the mating terminal can be reduced.

According to this embodiment, the first front end part 46 projects further forward than the second front end part 47.

Since the first front end part 46 is located on the foremost side in the tab portion 36, there is a higher possibility that the upper surface 62 of the first tip part 42 contacts the inner lips 24 of the mat seal 13. Thus, the damage of the inner lips 24 of the mat seal 13 can be further suppressed.

According to this embodiment, the region where the first and second contact parts 44, 45 are in contact is inclined to approach the second wall portion 38 toward the front side.

When the tab portion 36 is viewed from front, the projection area of the first tip part 42 from front is larger than that of the second tip part 43 from front. Thus, there is a higher possibility that the upper surface 62 of the first tip part 42 contacts the inner lips 24 of the mat seal 13. In this way, the damage of the inner lips 24 of the mat seal 13 can be further suppressed.

According to this embodiment, the contact region of the second wall portion 38 with the contact wall portion 40 serves as the recess 41 recessed in a stepped manner with respect to the other region of the second wall portion 38.

Since a vertical length of the contact wall portion 40 can be increased, it can be suppressed that the contact wall portion 40 is separated from the second wall portion 38 due to springback.

OTHER EMBODIMENTS (1) The number of the insertion holes 22 formed in the mat seal 13 and the number of the male terminal fittings 12 to be accommodated into the connector 10 are not limited to those of the above embodiment.

(2) Although the left side edge of the first wall portion 37 and the left side edge of the second wall portion 38 are coupled by the coupling wall portion 39 and the contact wall portion 40 is formed on the right side edge of the first wall portion 37 in the above embodiment, there is no limitation to this and the right side edge of the first wall portion 37 and the right side edge of the second wall portion 38 may be coupled by the coupling wall portion 39 and the contact wall portion 40 may be formed on the left side edge of the first wall portion 37.

(3) The recess 41 of the second wall portion 38 may be omitted.

(4) The number of the inner lips 24 formed in the insertion hole 22 of the mat seal 13 may be one, three or more. The number of the outer lips formed on the mat seal 13 may be one, three or more.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A male terminal fitting, comprising:

a base wall extending in a front-rear direction; and a plate-like tab portion extending forward from a front end part of the base wall, wherein:

the tab portion includes a first wall portion extending forward from the front end part of the base wall, a second wall portion facing the first wall portion, a coupling wall portion coupling side edges on one side, out of both left and right sides, of the first and second wall portions, and a contact wall portion extending from a side edge on the other side, out of the both left and right sides, of the first wall portion toward the second wall portion and abutting on the second wall portion, the front end part of the first wall portion is provided with a first tip part approaching the second wall portion toward a front side and a front end part of the second wall portion is provided with a second tip part approaching the first wall portion toward the front side, a first contact part of a front end part of the first tip part and a second contact part of a front end part of the second tip part are in contact, and front end parts of the first and second contact parts are located closer to the second wall portion than a center position of an interval between an outer surface of the first wall portion and an outer surface of the second wall portion.

2. The male terminal fitting of claim 1, wherein a first angle between an outer surface of the first tip part and the outer surface of the first wall portion is larger than a second angle between an outer surface of the second tip part and the outer surface of the second wall portion.

3. The male terminal fitting of claim 2, wherein the first angle between the outer surface of the first tip part and the outer surface of the first wall portion is 203.6° or more and 212.7° or less, and the second angle between the outer surface of the second tip part and the outer surface of the second wall portion is 190.6° or more and 197.9° or less.

4. The male terminal fitting of claim 1, wherein a percentage of an interval between a virtual plane as a forward extension of the outer surface of the first wall portion and the front end part of the first tip part to an interval between the outer surface of the first wall portion and the outer surface of the second wall portion is 35% or more and 52% or less.

5. The male terminal fitting of claim 1, wherein a forward projecting length of the first tip part from the front end part of the first wall portion is larger than a forward projecting length of the second tip part from the front end part of the second wall portion.

6. The male terminal fitting of claim 5, wherein a percentage of the projecting length of the first tip part from the front end part of the first wall portion to the projecting length of the second tip part from the front end part of the second wall portion is 101.8% or more and 138.2% or less.

7. The male terminal fitting of claim 1, wherein the front end part of the first tip part projects further forward than the front end part of the second tip part.

8. The male terminal fitting of claim 1, wherein a region where the first and second contact parts are in contact is inclined to approach the second wall portion toward the front side.

9. The male terminal fitting of claim 1, wherein a contact region of the second wall portion with the contact wall portion serves as a recess recessed in a stepped manner with respect to the other region of the second wall portion.

10. A connector, comprising:

the male terminal fitting of claim 1;

a connector housing including a cavity for accommodating the male terminal fitting;

a mat seal provided with an insertion hole corresponding to the cavity, the mat seal being mounted into the connector housing; and a holder for holding the mat seal mounted in the connector housing from behind in a mounting direction of the mat seal into the connector housing, wherein:

the holder includes a receiving hole extending in a front-rear direction at a position corresponding to the insertion hole, the male terminal fitting being inserted into the receiving hole, and the tab portion of the male terminal fitting is guided into the insertion hole of the mat seal by the outer surface of the first wall portion of the male terminal fitting sliding in contact with an inner peripheral surface of the receiving hole.

* * * * *